United States Patent
Pess et al.

(10) Patent No.: US 11,491,443 B2
(45) Date of Patent: *Nov. 8, 2022

(54) PROCESS WATER GAS MANAGEMENT OF ELECTROCHEMICAL INERT GAS GENERATING SYSTEM

(71) Applicant: HAMILTON SUNDSTRAND CORPORATION, Charlotte, NC (US)

(72) Inventors: Matthew Pess, West Hartford, CT (US); Jonathan Rheaume, West Hartford, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 883 days.

This patent is subject to a terminal disclaimer.

(21) Appl. No.: 16/375,659

(22) Filed: Apr. 4, 2019

(65) Prior Publication Data

US 2020/0316523 A1 Oct. 8, 2020

(51) Int. Cl.
*B01D 53/32* (2006.01)
*B64D 37/32* (2006.01)
*B01D 53/30* (2006.01)
*H01M 8/10* (2016.01)

(52) U.S. Cl.
CPC ........... *B01D 53/326* (2013.01); *B01D 53/30* (2013.01); *B64D 37/32* (2013.01); *H01M 8/10* (2013.01); *H01M 2250/20* (2013.01)

(58) Field of Classification Search
CPC .................. B01D 53/326; C25B 15/025–029
See application file for complete search history.

(56) References Cited

U.S. PATENT DOCUMENTS

| | | |
|---|---|---|
| 7,629,068 B2 | 12/2009 | Hoffjann et al. |
| 8,021,525 B2 | 9/2011 | Giddey et al. |
| 9,623,981 B2 | 4/2017 | Darling et al. |
| 9,963,792 B2 | 5/2018 | Rheaume |
| 10,179,309 B2 | 1/2019 | Rheaume et al. |
| 2003/0056647 A1* | 3/2003 | Gottzmann ............. F01K 3/185 95/54 |

(Continued)

FOREIGN PATENT DOCUMENTS

CA  3072021 A1  3/2019

OTHER PUBLICATIONS

"Oxygen-Solubility in Fresh Water and Seawater", The Engineering ToolBox, 2005, https://www.engineeringtoolbox.com/oxygen-solubility-water-d_841.html.

(Continued)

*Primary Examiner* — Nicholas A Smith
(74) *Attorney, Agent, or Firm* — Cantor Colburn LLP

(57) ABSTRACT

A system is disclosed for providing inerting gas to a protected space. The system includes an electrochemical cell comprising a cathode and an anode separated by a separator comprising a proton transfer medium. The cathode receives air from an air source and discharges an inerting gas to the protected space. The anode receives process water and discharges oxygen and unreacted process water to a process water fluid flow path. The process water fluid flow path includes a liquid-gas separator, and the liquid-gas separator includes an inlet and a liquid outlet each in operative fluid communication with the process water fluid flow path, and a gas outlet that discharges gas removed from the process water fluid flow path.

13 Claims, 4 Drawing Sheets

(56) References Cited

U.S. PATENT DOCUMENTS

| | | |
|---|---|---|
| 2017/0141417 A1 | 5/2017 | Lucas et al. |
| 2017/0167037 A1 | 6/2017 | Rheaume |
| 2017/0331131 A1 | 11/2017 | Rheaume |
| 2018/0140996 A1 | 5/2018 | Rheaume |
| 2019/0001264 A1 | 1/2019 | Rheaume et al. |
| 2020/0009412 A1 | 1/2020 | Rheaume |
| 2021/0101034 A1* | 4/2021 | Rheaume ................. A62C 3/08 |
| 2021/0101108 A1* | 4/2021 | Rheaume ................. C25B 15/02 |
| 2021/0101109 A1* | 4/2021 | Rheaume ............... B64D 37/32 |
| 2021/0101110 A1* | 4/2021 | Rheaume ............. B01D 53/326 |
| 2021/0130966 A1* | 5/2021 | Griffis ................. C02F 1/46104 |
| 2021/0254227 A1* | 8/2021 | Lee .................... B01D 19/0073 |

OTHER PUBLICATIONS

Extended European Search Report issued in Application No. 19211236.5 dated May 29, 2020, 6 pages.

\* cited by examiner

PROCESS WATER GAS MANAGEMENT OF ELECTROCHEMICAL INERT GAS GENERATING SYSTEM

BACKGROUND

The subject matter disclosed herein generally relates to systems for generating and providing inert gas, oxygen, and/or power on vehicles, and more specifically to thermal management of such systems.

It is recognized that fuel vapors within fuel tanks become combustible or explosive in the presence of oxygen. An inerting system decreases the probability of combustion or explosion of flammable materials in a fuel tank by maintaining a chemically non-reactive or inerting gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inerting gas such as nitrogen-enriched air (NEA) (i.e., oxygen-depleted air or ODA) to the ullage, thereby displacing oxygen with a mixture of nitrogen and oxygen at target thresholds for avoiding explosion or combustion.

It is known in the art to equip vehicles (e.g., aircraft, military vehicles, etc.) with onboard inerting gas generating systems, which supply nitrogen-enriched air to the vapor space (i.e., ullage) within the fuel tank. The nitrogen-enriched air has a substantially reduced oxygen content that reduces or eliminates oxidizing conditions within the fuel tank. Onboard inerting gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and nitrogen-enriched air (NEA) on the high-pressure side of the membrane. The requirement for a pressure differential necessitates a source of compressed or pressurized air. Another type of gas separator is based on an electrochemical cell such as a proton exchange membrane (PEM) electrochemical cell, which produces NEA by electrochemically generating protons for combination with oxygen to remove it from air.

BRIEF DESCRIPTION

A system is disclosed for providing inerting gas to a protected space. The system includes an electrochemical cell comprising a cathode and an anode separated by a separator comprising a proton transfer medium. A cathode fluid flow path is in operative fluid communication with the cathode between a cathode fluid flow path inlet and a cathode fluid flow path outlet. An anode fluid flow path in operative fluid communication with the anode, between an anode fluid flow path inlet and an anode fluid flow path outlet. A cathode supply fluid flow path is between an air source and the cathode fluid flow path inlet, and an inerting gas flow path in operative fluid communication with the cathode fluid flow path outlet and the protected space. An anode supply fluid flow path is between a process water source and the anode fluid flow path inlet. A process water fluid flow path is in operative fluid communication with the anode fluid flow path inlet and the anode fluid flow path outlet. The process water fluid flow path includes a liquid-gas separator, and the liquid-gas separator includes an inlet and a liquid outlet each in operative fluid communication with the process water fluid flow path, and a gas outlet that discharges gas removed from the process water fluid flow path.

In some aspects, the system further can further include a heater or a first heat exchanger including a heat absorption side in operative fluid communication with the process water fluid flow path.

In any one or combination of the above aspects, the system can further include a second heat exchanger including a heat rejection side in operative fluid communication with the process water fluid flow path and a heat absorption side in operative thermal communication with a heat sink.

In any one or combination of the above aspects, the liquid-gas separator inlet is in operative fluid communication with process water discharged from the heater or first heat exchanger, and the liquid-gas separator liquid outlet is in operative fluid communication with a heat rejection side inlet of the second heat exchanger.

In any one or combination of the above aspects, the system can further include a second heat exchanger including a heat rejection side in operative fluid communication with the process water fluid flow path and a heat absorption side in operative thermal communication with a heat sink.

In any one or combination of the above aspects, the system can include a plurality of said electrochemical cells in a stack separated by electrically-conductive fluid flow separators.

In any one or combination of the above aspects, the system can include a sensor configured to directly or indirectly measure dissolved oxygen content of process water that enters the gas-liquid separator, and a controller configured to provide a target response of the sensor through control of a flow rate of process water or a temperature of process water, or both a flow rate and a temperature of process water.

In any one or combination of the above aspects, the sensor can include a temperature sensor, and the controller is configured to provide a target temperature response of the temperature sensor.

In any one or combination of the above aspects, the sensor can further include an oxygen sensor, and the controller is configured to provide a target temperature response of the temperature sensor in response to output of the oxygen sensor.

In any one or combination of the above aspects, the controller can be configured to provide a target response of the measurement device through control of a flow rate of process water on the anode fluid flow path and/or the cathode fluid flow path.

In any one or combination of the above aspects, the controller can be configured to provide a target response of the measurement device through control of a flow rate through control of a voltage differential applied between the anode and the cathode.

In any one or combination of the above aspects, the controller can be configured to provide a target response of the sensor through control of a flow of process water through a heat transfer device or through a control of a temperature of a heat transfer device.

In any one or combination of the above aspects, the controller can be configured to operate the inerting system in a mode selected from a plurality of modes including a first mode under normal operating conditions and an oxygen removal mode in response to a high oxygen level signal from the sensor.

Also disclosed is a method of inerting a protected space. According to the method, process water is delivered to an anode of an electrochemical cell comprising the anode and a cathode separated by a separator comprising a proton transfer medium. According to the method, gas is removed from the process water to form de-gassed process water and the de-gassed process water is recycled to the anode. Air is delivered to the cathode and oxygen is reduced at the cathode to generate oxygen-depleted air, and the oxygen-depleted air is directed from the cathode of the electrochemical cell along an inerting gas flow path to the protected space.

In some aspects, the method can further include controlling a flow rate of process water or a temperature of process water, or both a flow rate and a temperature of process water, to provide a target level of dissolved oxygen in the process water.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Although shown and described above and below with respect to an aircraft, embodiments of the present disclosure are applicable to on-board systems for any type of vehicle or for on-site installation in fixed systems. For example, military vehicles, heavy machinery vehicles, sea craft, ships, submarines, etc., may benefit from implementation of embodiments of the present disclosure. For example, aircraft and other vehicles having fire suppression systems, emergency power systems, and other systems that may electrochemical systems as described herein may include the redundant systems described herein. As such, the present disclosure is not limited to application to aircraft, but rather aircraft are illustrated and described as example and explanatory embodiments for implementation of embodiments of the present disclosure.

Figure 1A:
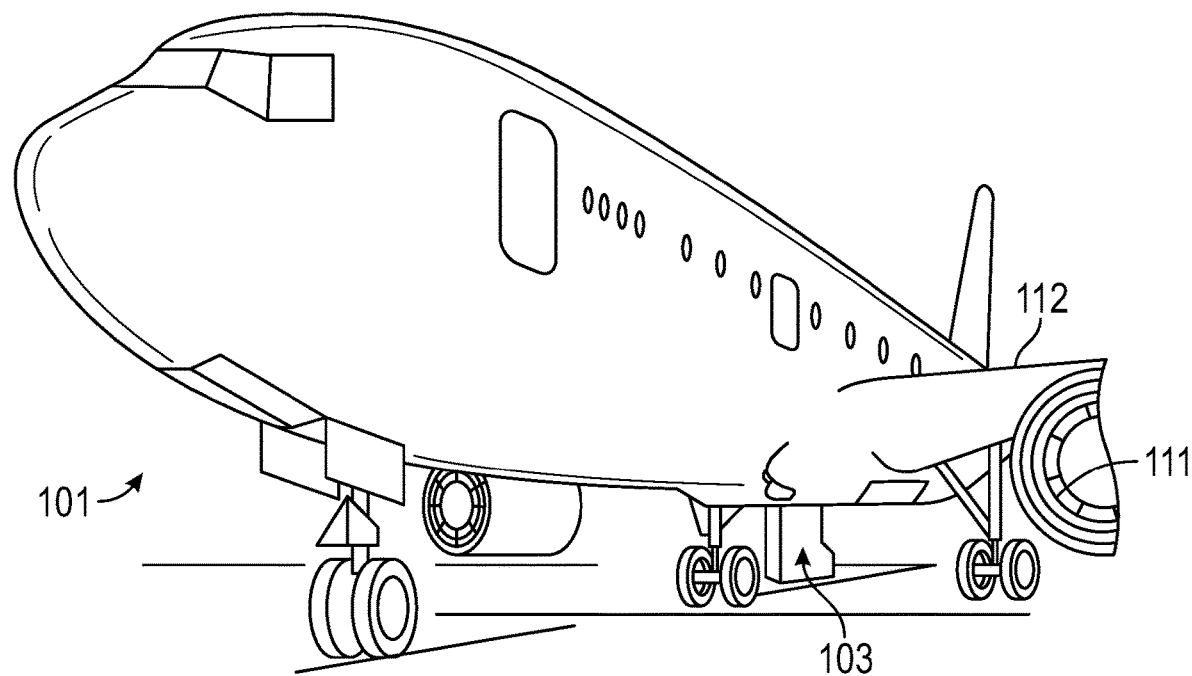
FIG. 1A is a schematic illustration of an aircraft that can incorporate various embodiments of the present disclosure.
Figure 1B:
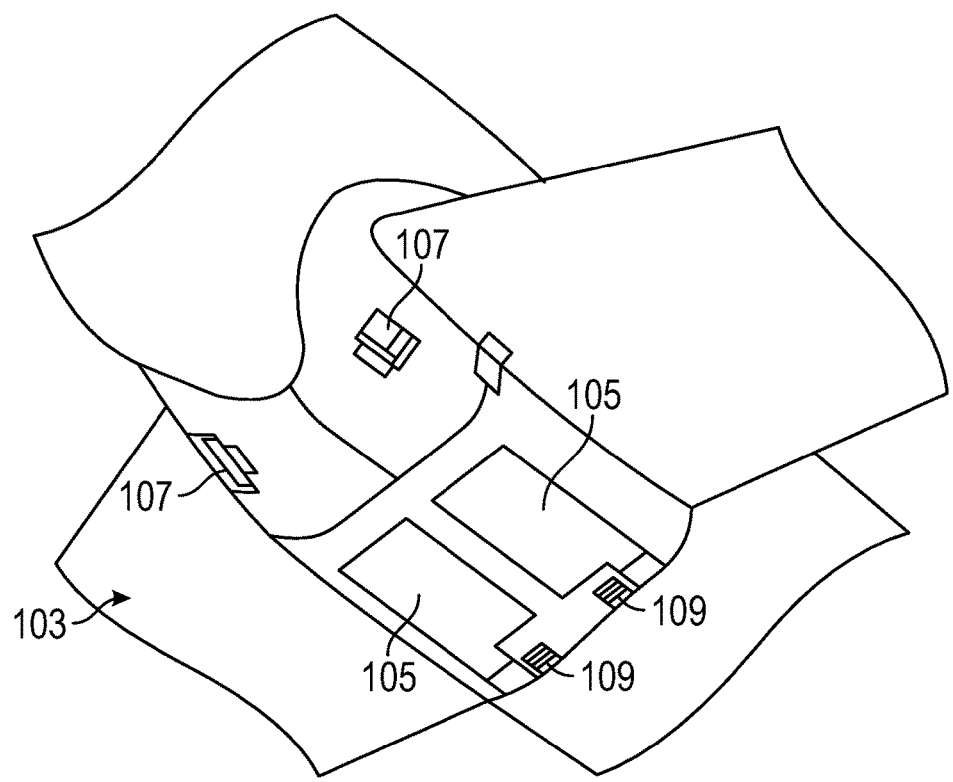
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems (ECS) and/or on-board inerting gas generation systems (OBIGGS) within the bay 103. As shown in FIG. 1B, the bay 103 includes bay doors 105 that enable installation and access to one or more components (e.g., OBIGGS, ECS, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to OBIGGS, ECS, and/or other systems, as will be appreciated by those of skill in the art.

Figure 2:
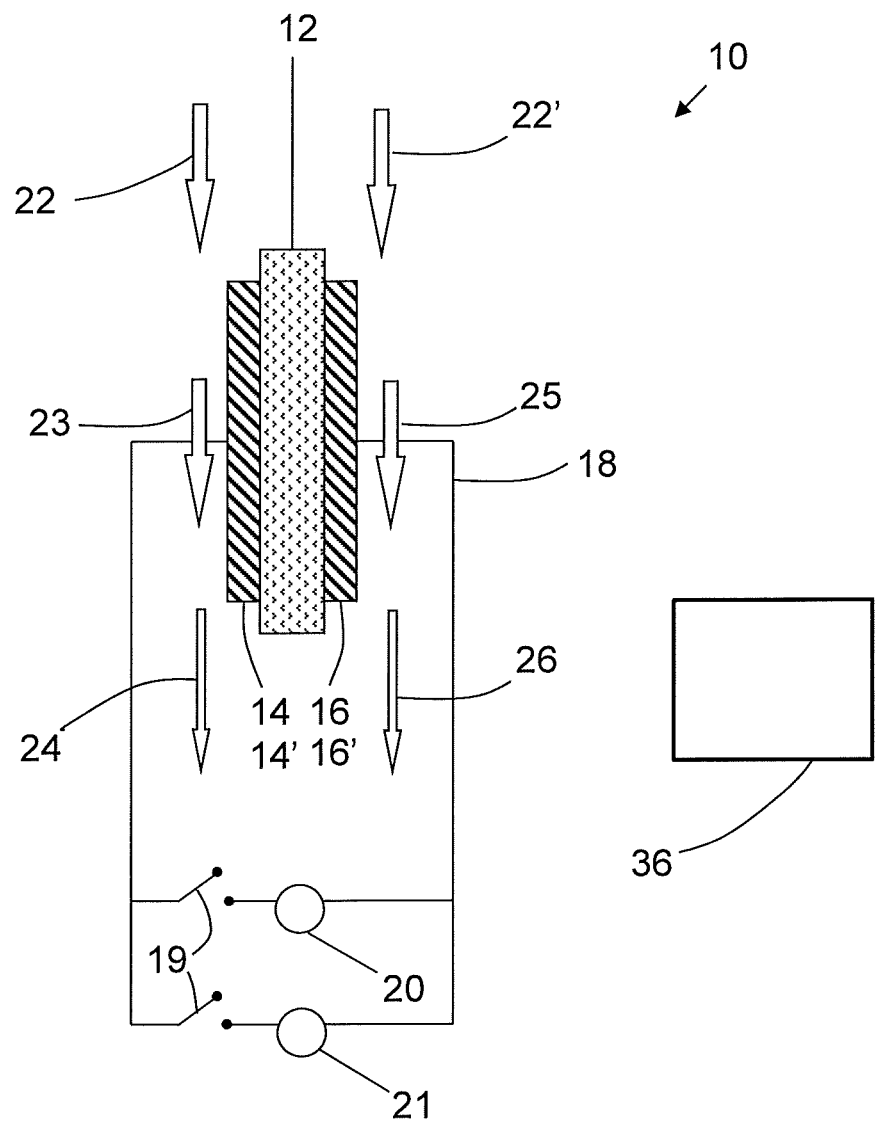
FIG. 2 is a schematic depiction an example embodiment of an electrochemical cell.

Referring now to FIG. 2, an electrochemical cell is schematically depicted. The electrochemical cell 10 comprises a separator 12 that includes an ion transfer medium. As shown in FIG. 2, the separator 12 has a cathode 14 disposed on one side and an anode 16 disposed on the other side. Cathode 14 and anode 16 can be fabricated from catalytic materials suitable for performing the needed electrochemical reaction (e.g., the oxygen-reduction reaction at the cathode and an oxidation reaction at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Cathode 14 and anode 16, including catalyst 14' and catalyst 16', are positioned adjacent to, and preferably in contact with the separator 12 and can be porous metal layers deposited (e.g., by vapor deposition) onto the separator 12, or can have structures comprising discrete catalytic particles adsorbed onto a porous substrate that is attached to the separator 12. Alternatively, the catalyst particles can be deposited on high surface area powder materials (e.g., graphite or porous carbons or metal-oxide particles) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, the cathode and anode layers 14 and 16 may also include a binder material, such as a polymer, especially one that also acts as an ionic conductor such as anion-conducting ionomers. In some embodiments, the cathode and anode layers 14 and 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 14 and anode 16 can be controllably electrically connected by electrical circuit 18 to a controllable electric power system 20, which can include a power source (e.g., DC power rectified from AC power produced by a generator powered by a gas turbine engine used for propulsion or by an auxiliary power unit) and optionally a power sink 21. In some embodiments, the electric power system 20 can optionally include a connection to the electric power sink 21 (e.g., one or more electricity-consuming systems or components onboard the vehicle) with appropriate switching (e.g., switches 19), power conditioning, or power bus(es) for such on-board electricity-consuming systems or components, for optional operation in an alternative fuel cell mode.

With continued reference to FIG. 2, a cathode supply fluid flow path 22 directs gas from an air source (not shown) into contact with the cathode 14. Oxygen is electrochemically depleted from air along the cathode fluid flow path 23, and can be exhausted to the atmosphere or discharged as nitrogen-enriched air (NEA) (i.e., oxygen-depleted air, ODA) to an inerting gas flow path 24 for delivery to an on-board fuel tank (not shown), or to a vehicle fire suppression system associated with an enclosed space (not shown), or controllably to either or both of a vehicle fuel tank or an on-board fire suppression system. An anode fluid flow path 25 is configured to controllably receive an anode supply fluid from an anode supply fluid flow path 22'. The anode fluid flow path 25 includes water when the electrochemical cell is operated in an electrolytic mode to produce protons at the anode for proton transfer across the separator 12 (e.g., a proton transfer medium such as a proton exchange membrane (PEM) electrolyte or phosphoric acid electrolyte). If the system is configured for alternative operation in a fuel cell mode, the anode fluid flow path 25 can be configured to controllably also receive fuel (e.g., hydrogen). The protons formed at the anode are transported across the separator 12 to the cathode 14, leaving oxygen on the anode fluid flow path, which is exhausted through an anode exhaust 26. Control of fluid flow along these flow paths can be provided through conduits and valves (not shown), which can be controlled by a controller 36 including a programmable or programmed microprocessor.

Exemplary materials from which the electrochemical proton transfer medium can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazoie). These types of alternative "membrane electrolytes" are well known and have been used in other electrochemical cells, such as phosphoric-acid fuel cells.

During operation of a proton transfer electrochemical cell in the electrolytic mode, water at the anode undergoes an electrolysis reaction according to the formulae:

$$H_2O \rightarrow 1/2 O_2 + 2H^+ + 2e^- \quad (1)$$

The electrons produced by this reaction are drawn from electrical circuit 18 powered by electric power source 20 connecting the positively charged anode 16 with the cathode 14. The hydrogen ions (i.e., protons) produced by this reaction migrate across the separator 12, where they react at the cathode 14 with oxygen in the cathode flow path 23 to produce water according to the formula $$1/2 O_2 + 2H^+ + 2e^- \rightarrow H_2O \quad (2)$$

Removal of oxygen from cathode flow path 23 produces nitrogen-enriched air exiting the region of the cathode 14. The oxygen evolved at the anode 16 by the reaction of formula (1) is discharged as anode exhaust 26.

During operation of a proton transfer electrochemical cell in a fuel cell mode, fuel (e.g., hydrogen) at the anode undergoes an electrochemical oxidation according to the formula $$H_2 \rightarrow 2H^+ + 2e^- \quad (3)$$

The electrons produced by this reaction flow through electrical circuit 18 to provide electric power to the electric power sink 21. The hydrogen ions (i.e., protons) produced by this reaction migrate across the separator 12, where they react at the cathode 14 with oxygen in the cathode flow path 23 to produce water according to the formula (2).

$$1/2 O_2 + 2H^+ + 2e^- \rightarrow H_2O \quad (2)$$

Removal of oxygen from cathode flow path 23 produces nitrogen-enriched air exiting the region of the cathode 14.

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice some amount of moisture will be removed through the cathode exhaust 24 and/or the anode exhaust 26 (either entrained or evaporated into the exiting gas streams). Accordingly, in some exemplary embodiments, water from a water source is circulated past the anode 16 along an anode fluid flow path (and optionally also past the cathode 14). Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16 (e.g., through a water circulation loop, not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

Figure 3:
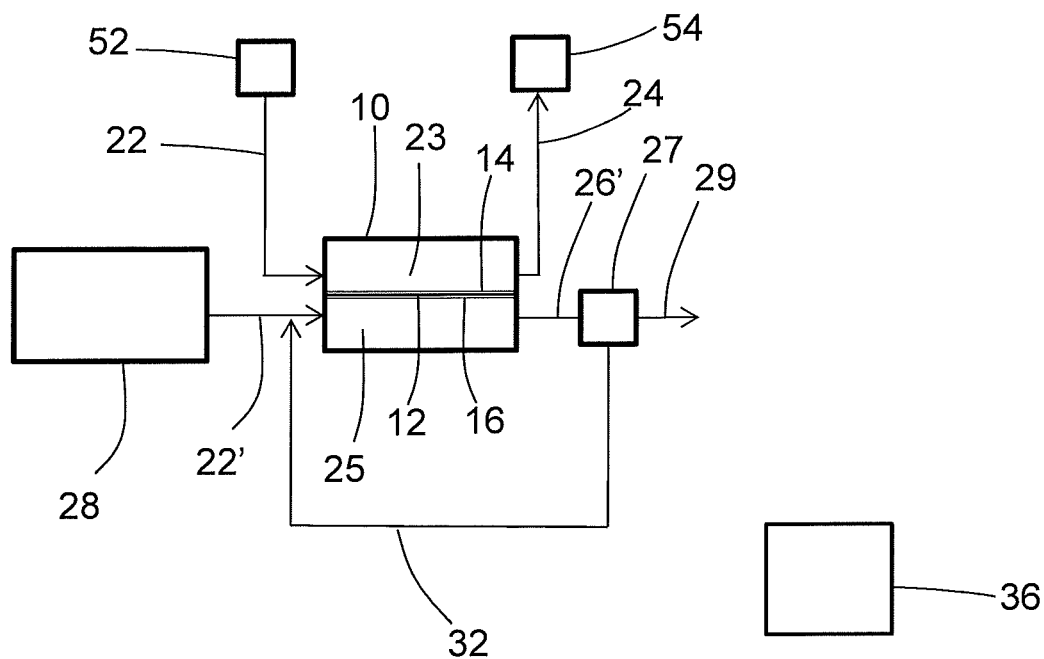
FIG. 3 is a schematic illustration of an example embodiment of an electrochemical inert gas generating system.

An example embodiment of a protected space inerting water treatment system that can be used as an on-board aircraft inerting system with an electrochemical cell 10 is schematically shown in FIG. 3. As shown in FIG. 3, water from a process water source 28 is directed (e.g., by a pump, not shown) along the anode supply fluid flow path 22' to the anode fluid flow path 25, where it is electrolyzed at the anode 16 to form protons, and oxygen. The protons are transported across the separator 12 to the cathode 14, where they combine with oxygen from airflow along the cathode fluid flow path 23 to form water. Removal of the protons from the anode fluid flow path 25 leaves oxygen gas on the anode fluid flow path, which is discharged as anode exhaust 26 to a fluid flow path 26'. As further shown in FIG. 3, the fluid flow path 26' includes a gas-liquid separator 27. Although water is consumed at the anode by electrolysis, the fluid exiting as anode exhaust 26 can include gaseous oxygen and unreacted liquid water. The oxygen is separated as a gas stream 29 that can be exhausted to atmosphere or can be used for other applications such as an oxygen stream directed to aircraft occupant areas, occupant breathing devices, an oxygen storage tank, or an emergency aircraft oxygen breathing system. Gas-liquid separators utilized in this disclosure can provide a beneficial technical effect of promoting removal of gas evolved at the anode 16 and gas evolved from dissolved gas(es) in the liquid water. Without removal, such gas(es) could accumulate in the system, and excess levels of gas(es) (including both gases dissolved in the liquid water and also in a gas phase) can cause problems such as pump cavitation or causing an equilibrium-based shift contrary to the electrolysis reaction(s) at the anode (see Le Chatelier's Principle). The gas-liquid separator 27 can include a tank with a liquid space and a vapor space inside, allowing for liquid water to be removed from the liquid space and transported back to the electrochemical cell 10 through water return conduit 32. Additional gas-liquid separators can be used such as coalescing filters, vortex gas-liquid separators, or membrane separators.

As further shown in FIG. 3, the electrochemical cell or cell stack 10 generates an inerting gas on the cathode fluid flow path 23 by depleting oxygen to produce oxygen-depleted air (ODA), also known as nitrogen-enriched air (NEA) at the cathode 14 that can be directed to a protected space 54 (e.g., a fuel tank ullage space, a cargo hold, or an equipment bay). As shown in FIG. 3, an air source 52 (e.g., ram air, compressor bleed, blower) is directed to the cathode fluid flow path 23 where oxygen is depleted by electrochemical reactions with protons that have crossed the separator 12 as well as electrons from an external circuit (not shown) to form water at the cathode 14. The ODA thereby produced can be directed to a protected space 54 such as an ullage space in in the aircraft fuel tanks as disclosed or other protected space 54. The inerting gas flow path (cathode exhaust 24) can include additional components (not shown) such as flow control valve(s), a pressure regulator or other pressure control device, and water removal device(s) such as a heat exchanger condenser, a membrane drier or other water removal device(s), or a filter or other particulate or contaminant removal devices. Additional information regarding the electrochemical production of ODA can be found in U.S. Pat. No. 9,963,792, US Patent Application Publication No. 2017/0331131A1, and U.S. patent application Ser. No. 16/029,024, the disclosures of each of which are incorporated herein by reference in their entirety.

In some embodiments, the electrochemical cell can be used in an alternate mode to provide electric power for on-board power-consuming systems, as disclosed in the aforementioned US Patent Application Publication No. 2017/0331131A1. In this mode, fuel (e.g., hydrogen) is directed from a fuel source to the anode 16 where hydrogen molecules are split to form protons that are transported across the separator 12 to combine with oxygen at the cathode. Simultaneously, reduction and oxidation reactions exchange electrons at the electrodes, thereby producing electricity in an external circuit. Embodiments in which these alternate modes of operation can be utilized include, for example, operating the system in alternate modes selected from a plurality of modes including a first mode of water electrolysis (either continuously or at intervals) under normal aircraft operating conditions (e.g., in which an engine-mounted generator provides electrical power) and a second mode of electrochemical electricity production (e.g., in response to a demand for emergency electrical power such as due to failure of an engine-mounted generator). ODA can be produced at the cathode 14 in each of these alternate modes of operation.

In some embodiments, the gas inerting system can promote gas(es) dissolved in the process water (e.g., oxygen) to evolve gas in the gas phase that can be separated from the process water fluid flow path in a liquid-gas separator such as 27. The solubility of gases such as oxygen in water varies inversely with temperature and varies directly with pressure. Accordingly, higher temperatures provide lower solubility of oxygen in water, and lower temperatures provide greater solubility of oxygen in water. Similarly, reduced pressures provide lower solubility of oxygen in water. In some embodiments, the systems described herein can be configured to promote dissolution of gas(es) dissolved in the process water through thermal control and/or pressure control to promote evolution of gases in the gas phase for removal from the process water fluid flow path. Thermal and pressure management is provided as discussed in more detail below.

Figure 4:
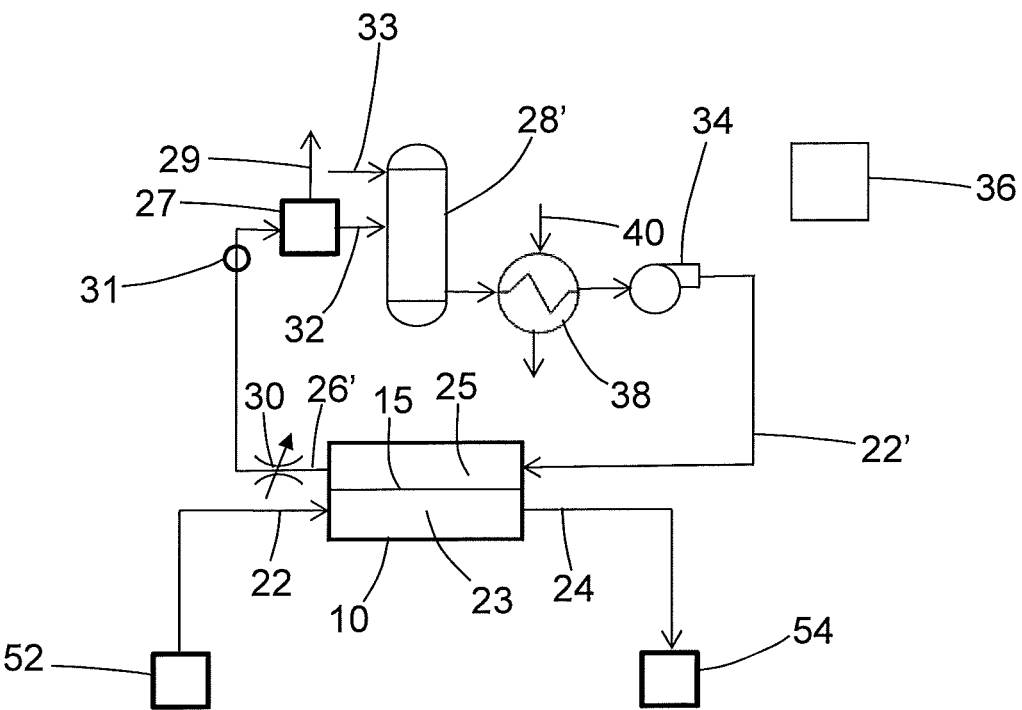
FIG. 4 is a schematic illustration of another example embodiment of an electrochemical inert gas generating system.

With reference now to FIG. 4, an example embodiment is shown of a gas inerting system utilizing an electrochemical cell or stack 10 and thermal and/or pressure management. As shown in FIG. 4, the cathode side of the electrochemical cell or stack 10 produces ODA on the cathode fluid flow path 23 as inerting gas for a protected space in the same manner as discussed above with respect to FIG. 3. Also, for ease of illustration, the separator 12, cathode 14, and anode 16 are shown as a single membrane electrode assembly (MEA) 15. It is noted that FIG. 4 shows counter-flow between the anode and cathode sides of the MEA 15, whereas FIG. 3 shows co-flow; however, many configurations can utilize cross-flow configurations that for ease of illustration are not shown in the Figures herein. It is further noted that, although not shown in FIG. 4, process water for thermal management can also be in fluid and thermal communication with the cathode side of the electrochemical cell as will be understood by the skilled person. On the anode side, process water from the water source (e.g. a water reservoir 28' equipped with a process make-up water feed line 33) is directed along the anode supply fluid flow path 22' by a pump 34. The pump 34 provides a motive force to move the process water along the anode fluid flow path 25, from which it is directed through flow control valve 30 to a gas-liquid separator 27. Oxygen or other gases on the process water fluid flow path can be removed by a gas-liquid separator 27, or the water reservoir 28' can itself serve as a gas-liquid separator by providing a sufficiently large volume for reduced flow velocity and a vapor space for gas-liquid separation.

As mentioned above, in some embodiments the controller 36 can control system operating parameters to provide a target dissolved gas content (e.g., a dissolved oxygen content) in the process water during operation. Dissolved oxygen concentration in the process water can be measured directly. Examples of oxygen sensors include (i.e., an oxygen sensor calibrated to determine dissolved oxygen content), but are not limited to sensors that utilize the measurement of variables such as impedance, spectral transmittance/absorbance of light, chemical reactivity of analytes with dissolved oxygen, electrochemical sensors (including the anode and cathode of the electrochemical cell/stack 10 and spot measurements thereon), chemical interactions, or combinations (e.g., chemiluminescent sensors). Dissolved oxygen levels can also be determined without a sensor calibrated directly for dissolved oxygen. For example, this can be accomplished by measuring one or more of other process parameters including but not limited to process water temperature, electrode temperatures, electrode voltages, electrode current densities, water pressure, vapor pressure (e.g., in a vapor phase in the liquid-gas separator 27), cumulative readings and values determined over time for any of the above or other measured system parameters, elapsed time of operation, and comparing such parameters against empirical oxygen content data (e.g., a look-up table) to determine an inferred dissolved oxygen concentration. A sensor 31 is shown in FIG. 4 disposed in the flow path 26', and can represent one or more sensors at the location shown or elsewhere in the system to measure any one or more of the above-mentioned or other parameters. For the sake of discussion below, the sensor 31 may be referred to as measuring for a concentration of dissolved oxygen in the process water, process water temperature, gas temperature, and pressure including gas pressure or liquid pressure. The sensors represented by sensor 31 can be located as shown in FIG. 4 at or immediately upstream of the liquid-gas separator 27. Other sensor locations can be utilized. For example, a dissolved oxygen sensor and/or temperature sensor could be disposed in the liquid space in reservoir 28'. Process water temperature and pressure can be measured at any of a number of potential locations such as at the anode flow path outlet, or upstream and/or downstream of the pump 34, or upstream and/or downstream of the flow control valve 30, or anywhere along either or both of the cathode fluid flow path 23 or the anode fluid flow path 25.

As mentioned above, the solubility of oxygen in water varies inversely with temperature, and in some embodiments the system can be controlled to add heat to the process water to promote dissolution and evolution of gas phase oxygen so that it can be separated and removed. In some embodiments, the process water can be contacted with a heat source upstream of a liquid-gas separator. A separate heat source can be used, such as a heater or a heat exchanger with a heat rejection side in fluid and/or thermal communication with a heat source. The heat source can also be the electrochemical cell/stack 10 itself. The enthalpy of the chemical reactions resulting from electrolytic generation of inerting gas occurring on each side of the separator 12 are balanced, with water molecules being split on the anode side and atoms combined to form water on the cathode side. Accordingly, the electrical energy entered into the system results in generation of heat. Disposition of a gas-liquid separator 27 in the flow path 26' downstream of the cell/stack 10 allows for heat generated by the cell/stack 10 to promote evolution of oxygen for removal from the process water. Continual addition of heat into the system to promote oxygen removal could cause heat to accumulate in the system, and thermal management of the system can be accomplished with various protocols. For example, in some embodiments, heat can be dissipated into a volume of water such as the reservoir 28' without increasing process water temperatures outside of normal parameters during a projected duration of system operation. However, in situations where the reservoir 28' cannot absorb process heat within tolerances, a heat exchanger can be included in the system as shown in FIG. 4 with heat exchanger 38. The heat exchanger 38 can provide cooling from a heat sink along the heat transfer flow path 40 (e.g., RAM air, a refrigerant from a cooling system such as a vapor compression cooling system). Multiple heat exchangers can also be used.

Figure 5:
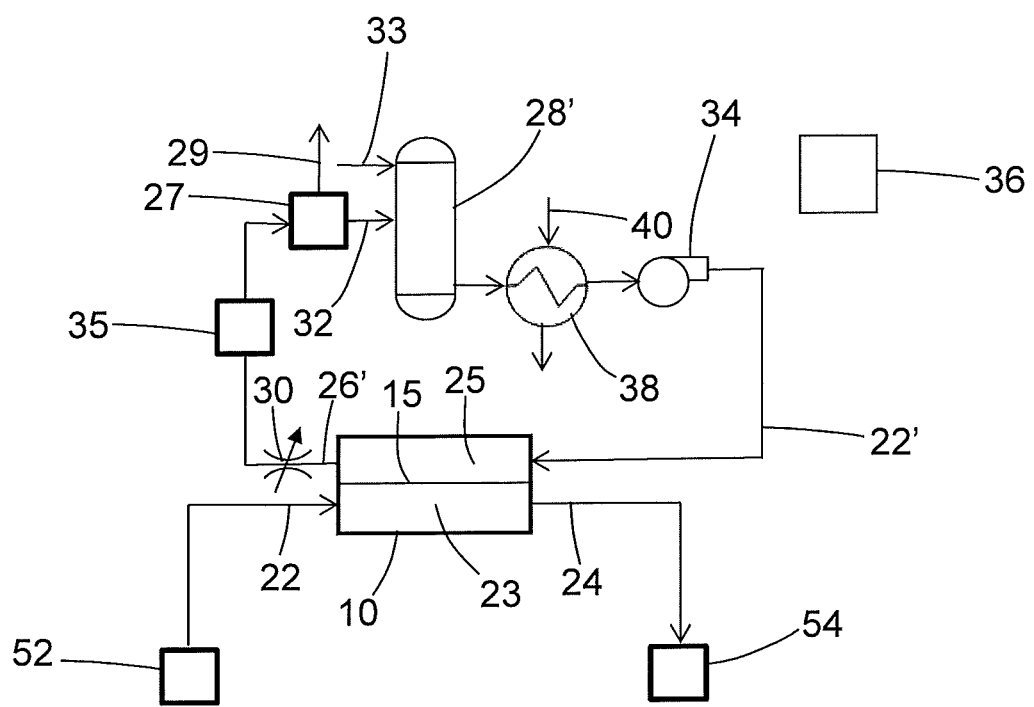
FIG. 5 is a schematic illustration of an example embodiment of another electrochemical inert gas generating system.

In some embodiments, the electrochemical cell stack 10' can be controlled to operate at parameters that provide a temperature at or upstream of a liquid-gas separator that is sufficient to produce a target dissolved oxygen level (as used herein, the terms upstream and downstream are defined as a position in a single iteration of the flow loop that begins and ends with the electrochemical cell stack 10'). In some embodiments, however, it may be desirable to operate the electrochemical cell stack at temperatures below that at which sufficient levels of dissolved oxygen are desolubilized. In such cases, a separate heater or heat exchanger can be included in the system, such as heater/exchanger 35 as shown in FIG. 5. The configuration of FIG. 5 can provide added heat from heater/exchanger 35 upstream of the gas-liquid separator 27, and the added heat can be dissipated into a heat sink such as reservoir 28' or can be removed with a heat exchanger such as heat exchanger 38. Alternatively, or in addition to the use of a heater/exchanger 35 to add heat to the system, in some embodiments the electrochemical cell stack can be operated temporarily at a higher temperature during an oxygen-removal cycle, and then returned to operate at a lower temperature after completion of the oxygen-removal cycle.

Pressure management can also be utilized for promotion of evolution of gaseous oxygen from dissolved oxygen. For example, the placement of the control valve 30 upstream of the liquid-gas-separator can provide a reduction in pressure that can promote evolving of oxygen for removal from the process water. Output pressure of the pump 34 can also modify pressure to promote oxygen evolution.

In some embodiments, the process water can be heated using the pump and a pressure regulator. The pump performs mechanical work on the process water to actively heat it. In this way, the pump and pressure regulator serve as a heating element. Those skilled in the art will readily appreciate that in accordance with the First Law of Thermodynamics, the work performed on the process water elevates the internal energy of said fluid. In addition, in some embodiments the process water may also remove waste heat from the pump (e.g. bearings, motor drive, etc.). Those skilled in the art will readily appreciate that the work imparted to a fluid results from the change in the pressure and the change in volume of the fluid.

Flow rate of the process water through the electrochemical cell can be regulated by controlling the speed of the pump 34 or with a pressure regulator (not shown) along the process water flow path (e.g., 26'). Control of process water temperature based on output from a temperature sensor (not shown) along the anode fluid flow path 25 (and/or a temperature sensor along the cathode fluid flow path 23) can be accomplished, for example, by controlling the flow of process water through the heat exchanger 38 (e.g., by controlling the speed of the pump 34 or by diverting a controllable portion of the output flow of the pump 34 through a bypass around the heat exchanger 38 with control valves (not shown)) or by controlling the flow of a heat transfer fluid through the heat exchanger 38 along the flow path represented by 40.

It should be noted that system configurations shown in FIGS. 4-5 represent example embodiments, and that changes and modifications are contemplated. For example, in some embodiments a heat source (including the electrochemical cell or stack ("stack"), or a separate heat source) can be disposed upstream of a gas-liquid separator ("separator"), which can be disposed upstream of a heat-absorbing heat exchanger ("HX") in thermal communication with a heat sink. Such embodiments can provide a technical benefit of adding heat to promote evolution of gas from gas dissolved in the process water, and subsequent removal of such added heat from the process water. Examples of configurations of components include but are not limited to stack→heat source→separator→HX, heat source→stack→separator→HX, stack→separator→HX. A pressure regulator can also be included to provide a lower pressure at the separator to promote evolution of gas, for example with an order of components of pump→stack/heat source→pressure regulator→separator→HX.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an", "the", or "any" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing inerting gas to a protected space, comprising
    an electrochemical cell comprising a cathode and an anode separated by a separator comprising a proton transfer medium;
    a cathode fluid flow path in operative fluid communication with the cathode between a cathode fluid flow path inlet and a cathode fluid flow path outlet;
    an anode fluid flow path in operative fluid communication with the anode, between an anode fluid flow path inlet and an anode fluid flow path outlet;
    a cathode supply fluid flow path between an air source and the cathode fluid flow path inlet, and an inerting gas flow path in operative fluid communication with the cathode fluid flow path outlet and the protected space;
    an anode supply fluid flow path between a process water source and the anode fluid flow path inlet; and
    a process water fluid flow path in operative fluid communication with the anode fluid flow path inlet and the anode fluid flow path outlet, including a liquid-gas separator, said liquid-gas separator including an inlet and a liquid outlet each in operative fluid communication with the process water fluid flow path, and a gas outlet that discharges gas removed from the process water fluid flow path;
    a sensor configured to directly or indirectly measure dissolved oxygen content of process water that enters the gas-liquid separator; and
    a controller configured to provide a target response of the sensor through control of a flow rate of process water or a temperature of process water, or both a flow rate and a temperature of process water.

2. The system of claim 1, further comprising a heater or a first heat exchanger including a heat absorption side in operative fluid communication with the process water fluid flow path.

3. The system of claim 2, further comprising a second heat exchanger including a heat rejection side in operative fluid communication with the process water fluid flow path and a heat absorption side in operative thermal communication with a heat sink.

4. The system of claim 3, wherein the liquid-gas separator inlet is in operative fluid communication with process water discharged from the heater or first heat exchanger, and the liquid-gas separator liquid outlet is in operative fluid communication with a heat rejection side inlet of the second heat exchanger.

5. The system of claim 1, further comprising a second heat exchanger including a heat rejection side in operative fluid communication with the process water fluid flow path and a heat absorption side in operative thermal communication with a heat sink.

6. The system of claim 1, comprising a plurality of said electrochemical cells in a stack separated by electrically-conductive fluid flow separators.

7. The system of claim 1, wherein the sensor includes a temperature sensor, and the controller is configured to provide a target temperature response of the temperature sensor.

8. The system of claim 1, wherein the sensor further includes an oxygen sensor, and the controller is configured to provide a target temperature response of the temperature sensor in response to output of the oxygen sensor.

9. The system of claim 1, wherein the controller is configured to provide a target response of the sensor through control of a flow rate of process water on the anode fluid flow path and/or the cathode fluid flow path.

10. The system of claim 1, wherein the controller is configured to provide a target response of the sensor through control of a flow rate through control of a voltage differential applied between the anode and the cathode.

11. The system of claim 1, wherein the controller is configured to provide a target response of the sensor through control of a flow of process water through a heat transfer device or through a control of a temperature of a heat transfer device.

12. The system of claim 1, wherein the controller is configured to operate the inerting system in a mode selected from a plurality of modes including a first mode under normal operating conditions and in an oxygen removal mode in response to a high oxygen level signal from the sensor.

13. A method of inerting a protected space, comprising
    delivering process water to an anode of an electrochemical cell comprising the anode and a cathode separated by a separator comprising a proton transfer medium;
    removing gas from the process water to form de-gassed process water and recycling the de-gassed process water to the anode;
    delivering air to the cathode and reducing oxygen at the cathode to generate oxygen-depleted air;
    directing the oxygen-depleted air from the cathode of the electrochemical cell along an inerting gas flow path to the protected space; and
    controlling a flow rate of process water or a temperature of process water, or both a flow rate and a temperature of process water, to provide a target level of dissolved oxygen in the process water.

* * * * *